United States Patent
Heilbron

(10) Patent No.: US 9,903,993 B2
(45) Date of Patent: Feb. 27, 2018

(54) LIGHTED DISPLAY DEVICES COMPRISED IN PART OF FLAT FIBER OPTIC MATERIAL

(71) Applicant: Valerie J. Heilbron, Santa Fe, NM (US)

(72) Inventor: Valerie J. Heilbron, Santa Fe, NM (US)

(*) Notice: Subject to any disclaimer, the term of this patent is extended or adjusted under 35 U.S.C. 154(b) by 0 days.

(21) Appl. No.: 15/075,111

(22) Filed: Mar. 19, 2016

(65) Prior Publication Data

US 2016/0274288 A1    Sep. 22, 2016

Related U.S. Application Data

(60) Provisional application No. 62/135,778, filed on Mar. 20, 2015.

(51) Int. Cl.
| | |
|---|---|
| *F21V 7/04* | (2006.01) |
| *F21V 8/00* | (2006.01) |
| *G06F 3/16* | (2006.01) |
| *A63H 33/26* | (2006.01) |
| *A63H 17/28* | (2006.01) |
| *A63H 19/14* | (2006.01) |

(52) U.S. Cl.
CPC .............. *G02B 6/001* (2013.01); *A63H 17/28* (2013.01); *A63H 19/14* (2013.01); *A63H 33/26* (2013.01); *G06F 3/165* (2013.01)

(58) Field of Classification Search
CPC .... G02B 6/001; G02B 6/0005; G02B 6/0006; G02B 6/0008; A63H 17/28; A63H 19/04; A63H 33/26; G06F 3/165
See application file for complete search history.

(56) References Cited

U.S. PATENT DOCUMENTS

| | | | | |
|---|---|---|---|---|
| 4,693,552 A | * | 9/1987 | Jeskey ..................... | G02B 6/06 385/116 |
| 4,977,487 A | * | 12/1990 | Okano ..................... | B60Q 1/50 362/545 |
| 6,106,135 A | * | 8/2000 | Zingale ................... | A63H 27/10 362/186 |
| 2002/0110319 A1 | * | 8/2002 | Chung ................. | G02B 6/0008 385/31 |
| 2005/0135114 A1 | * | 6/2005 | Shen ................... | A47G 33/0845 362/565 |
| 2006/0291217 A1 | * | 12/2006 | Vanderschuit ......... | A63H 27/10 362/363 |
| 2015/0342307 A1 | * | 12/2015 | Weber ..................... | A44C 5/00 368/282 |

* cited by examiner

*Primary Examiner* — Laura Gudorf

(57) ABSTRACT

An illuminated display contained within a translucent container that employs flat fiber optic material as the primary illuminated design. When this material is illuminated at its base edge and the illumination is optionally programmed, light then travels to and is emitted all along its cut top edge, resulting in a clear "line of light" display that appears to exist in space, unattached from any other material and evokes a specific desired effect within the translucent container, including the effect of a specific ephemeral phenomenon. The illuminated display effect is often strengthened by adding one or more additional displays to the translucent container.

4 Claims, 2 Drawing Sheets

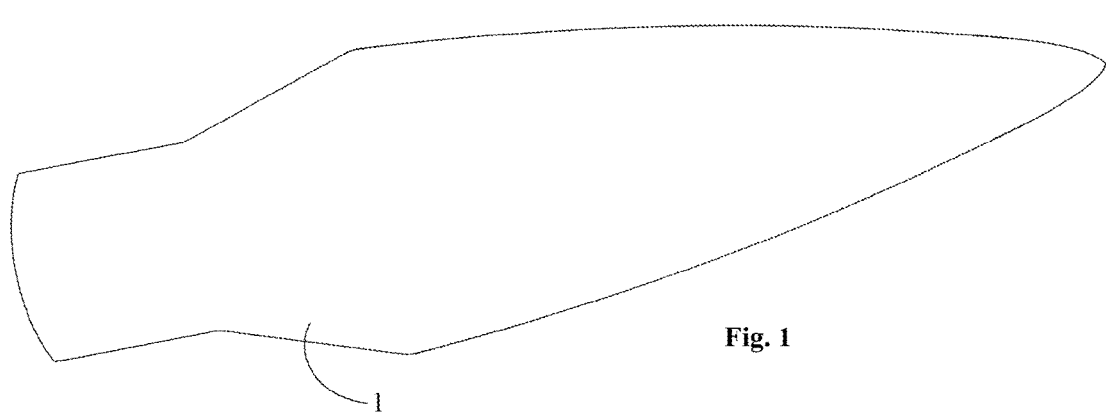
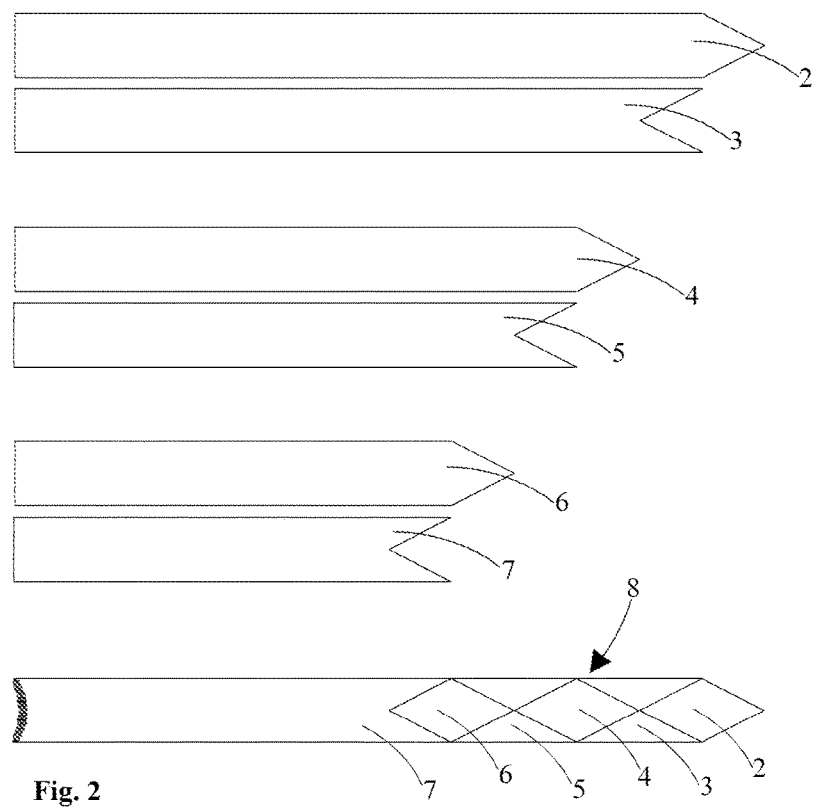

LIGHTED DISPLAY DEVICES COMPRISED IN PART OF FLAT FIBER OPTIC MATERIAL

RELATED U.S. APPLICATION DATA

Continuation-in-part of Provisional Patent Application 62/135,778 Mar. 20, 2015, "Animated Element: MACHtech—a simulated display of jet exhaust showing Mach diamonds"

GOVERNMENT RIGHTS STATEMENT

This invention was made with no government support.

FIELD OF THE INVENTION

The present invention relates generally to lighted displays. More particularly, disclosed and protected herein are lighted display devices employing flat fiber optic material for the primary illumination in lighted displays, including in certain embodiments, displays of simulated natural or manmade phenomena.

BACKGROUND OF THE INVENTION

The addition of a visible exhalation (such as smoke or exhaust) or a collection of particles (such as fairy dust) is a feature that can add real excitement to products, particularly toys. Examples of this are toy trains that appear to emit smoke, toy planes that appear to emit a jet exhaust, fairy wands that appear to emit fairy dust, superhero figures whose super powers are visible as simulated fire, freezing or colored emanations, etc. And there are many other possibilities, some of which have not yet been ideated in current products but will appear as products continue to develop different characteristics over time.

Products are not commonly constructed with features that actually produce smoke, fire, vapors or etc. because of size/materials limitations, safety concerns and cost. Therefore, such features are commonly realized through substitutions that simulate or evoke the effect of the various exhalations—for examples in toys: using mist to approximate smoke and using waving fabric to invoke the illusion of fire, both of which techniques give a general approximation of the named exhalations.

Illuminated displays within translucent containers typically use LEDs as illumination devices, are well known and can exist as many display forms, including a display that simulates an exhalation in a general way—for example when the glow from a red LED within a translucent container is taken to represent fire. As early as 1916, R. H. Hay disclosed a similar display device in U.S. Pat. No. 1,283, 751, comprising three illumination devices placed inside a translucent container and selectively illuminated to produce a glowing light effect of varying color. To date there exist many other inventions that pertain to the subject matter of illumination devices within translucent containers. Apart from their use in relation to the flat fiber optic material of the present invention, no claim is made to displays using illuminating devices placed within translucent containers. The present invention pertains to the assembly of a unique visual display (the "Flat Fiber Optic Display") that exploits the unique properties of flat fiber optic material and in so doing, may also employ additional displays in relation to or dependent on the flat fiber optic material.

Flat fiber optic material is a commercially available material made from strands of fiber optical cable that are placed side by side and glued together. Oftentimes a thin fabric material is adhered to the flat sides of the material to add stability to the material and impede cable separation from the glued whole. An illumination device disposed in optical communication with the material base edge causes light to travel up the optical fibers, emitting from the cut points of the material's top edge. In flat fiber optic material, the result of applied light to the base edge is a display in the shape of an illuminated line of light all along the cut fibers at the top edge of the material, an effect that is unique to this material.

The fiber optic cables used in flat fiber optic material can be any diameter and are typically end-glow cables where light emanates only from the cut end of the cable. The present invention pertains to use of flat fiber optic material that uses unmodified fiber optic cables and allows for a distinct, "line of light" display. The enhanced illuminated display capabilities that arise from use of modified fiber optic cables are within the purview of this invention only so far as they serve to enhance the display quality of the distinct, "line of light."

SUMMARY OF THE INVENTION

To add detail and improve on the simple visual effect of the known illuminated displays within translucent containers described above, the present invention uses flat fiber optic material to create a Flat Fiber Optic Display within a translucent container.

The display container is most practically made of plastic (although glass can also be used), and for best effect is translucent so the light emanating from inside the container shows through with just a little diffusion and minimal distortion. The shape of this container can vary considerably, from round balls to cones, to sculpted flames and more. This allows considerable variety in the look of the Flat Fiber Optic Display and allows certain shapes to be identified with certain products as signature Flat Fiber Optic Displays.

There are four (4) basic assemblies for the flat fiber optic material used to create a Flat Fiber Optic Display, all of which involve constructing the flat fiber optic material to fit in the translucent container and cutting the top edge of the material to achieve a desired design effect:

1. Where one piece of constructed flat fiber optic material is used, and there are no other illuminated displays within the container;
2. Where one piece of constructed flat fiber optic material is used, and there are one or more additional illuminated displays in the container;
3. Where multiple pieces of constructed flat fiber optic material are used, and there are no other illuminated displays within the container;
4. Where multiple pieces of constructed flat fiber optic material are used, and there are one or more additional illuminated displays within the container.

Whether used singly or in multiple pieces, the flat fiber optic material has a top edge that is either cut into shapes to produce a distinct outline or rough-cut to create a jagged, irregularly lit effect. The flat fiber optic material has its bulk rolled or otherwise constructed to fit in the translucent container.

When there is one piece of constructed flat fiber optic material, as in numbers 1 and 2 above, the base edge of that piece is disposed in optical communication with at least one illumination device that causes the cut top edge of the material to emit light and thereby produce an illuminated display within the translucent container.

When there is more than one piece of constructed flat optical fiber material in the display, as in numbers 3 and 4 above, the base edges of the material pieces are mated together in a number of bundles specified by the desired design and the bundled members of the base edges are disposed in optical communication with at least one illumination device per bundle that causes the top edges of the material in that bundle to emit light and thereby produce an illuminated display within the translucent container.

Additional displays included in the translucent container can take a variety of imaginative forms which variety precludes a detailed discussion here. The most commonly used additional display can stand for an example of all possible additional displays because the function of additional displays are to support the illuminated effect of flat fiber optic material in the Flat Fiber Optic Display, and despite the available variety, their use is always optional and will be the same in terms of placement and function as background effect. Flat fiber optic material not only provides the crucial design element in the overall Flat Fiber Optic Display, but it also serves to create an improved look to any additional displays because it is further constructed to encircle or cover the illumination devices that illuminate additional displays, thereby offering its special diffusion properties to improve the blended look of the background display. The most commonly used additional display is the known background glow display, consisting of at least one independent illumination device providing a background glow within the illumination volume of the container.

In addition to added background displays, another design element that can be useful in a Flat Fiber Optic Display is the addition of loose, shaped pieces made of paper, plastic, fabric or the like, sized to fit loosely within the translucent container. If these pieces are placed between the constructed flat fiber optic material and the wall of the translucent container, they will be always visible, will reflect light from all the displays in the translucent container and will move about randomly as the container is handled. If these pieces are trapped within a constructed column of flat fiber optic material, they will be invisible until the display is on, will only fully reflect the light from illumination devices within the flat fiber optic column and will move about randomly only within the flat fiber optic column. A particular embodiment of this last description produces an effect that looks like an animated series of bubbles representing the phenomenon of boiling water within a translucent container on a toy-cooking pan, for example.

In practical use, the translucent container containing the Flat Fiber Optic Display and possibly a background glow display is attached to an object. Objects can exist independently, in the form of a toy jet plane, or toy fairy wand for examples, where the translucent container housing the lighted display is affixed to the object. Objects can also be part of a two- or three-dimensional visual display where the translucent container housing the lighted display is affixed to the display in a visually appropriate way.

The present invention allows for optional programming to animate the illumination of the flat fiber optic material and also the illumination of any background displays included. Choice of which displays to animate and type of animation program to use depends on the desired overall illuminated effect in the translucent container. This programming can be implemented by adding a processor or it might be achieved within the capability of a "chip-on-board" illumination device. The animating programming can accommodate a synch to any sound file desired with a variety of animated effects to highlight the sound. In addition, the illumination devices can be programmed to be off when not needed in the animation program because this quiescence allows for a considerable power reserve that prolongs the battery life.

The Flat Fiber Optic Display can serve toy, novelty and point-of-purchase product conditions, such as:

Character toy accessories, such as a fairy wand that ends in a display of lighted stars, character icons, flowers, fairy dust or etc.

Toy trains and boats that show a waving animation signifying puffs of escaping smoke or steam, Super hero toys that have lit protrusions from bodies or accessories, signifying super powers, Point-of-Purchase signage that includes the Flat Fiber Optic Display as a 3D addition to a 2- or 3D illustration, to name a few.

BRIEF DESCRIPTION OF THE DRAWINGS

FIG. 1 Sample shape for the translucent container surrounding the electronics that comprise the Mach diamonds themed Flat Fiber Optic Display FIG. 2 Shape design of the pieces of flat fiber optic material required to make 3 illuminated diamonds with a 180° viewing effect for the Mach diamonds themed Flat Fiber Optic Display FIG. 2A View of the flat fiber optic material construct needed in a Mach diamonds themed Flat Fiber Optic Display where 6 illuminated diamonds are used to create a 360° viewing effect FIG. 3 View of the entire Mach diamonds themed Flat Fiber Optic Display where flat fiber optic material is used to create 3 illuminated diamonds

DETAILED DESCRIPTION OF A PREFERRED EMBODIMENT

Figure 2A:
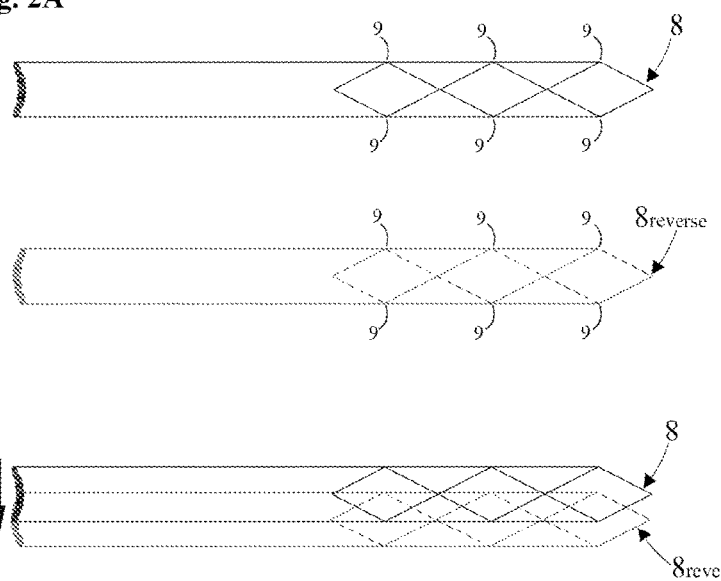

The preferred embodiment discussed is a Flat Fiber Optic Display that simulates the phenomenal appearance of Mach diamonds within a jet exhaust. This is a type 4 assembly of flat fiber optic material, as discussed above. It consists of the combination of two particular lighted displays within a translucent shell (FIG. 1, 1), which are briefly described as follows:

The first display is a construct made from multiple pieces of flat fiber optic material (FIG. 2, 8), illuminated by one blue LED (FIG. 3, 14) and designed to simulate the appearance of blue Mach diamonds that glow within jet exhaust when the jet reaches supersonic speed.

The second display is placed behind a single construct of flat fiber optic material (FIG. 2, 8) or within the column formed by using two constructs of flat fiber optic material (FIG. 2, 8 and FIG. 2, 8-reverse) and is a background glow (FIGS. 3, 10 through 13 and 15) that uses three LEDs to generally simulate jet exhaust meant to appear from the exhaust pipe of a toy—plane, land vehicle or rocket, etc. All LEDs in this Flat Fiber Optic Display are each independently connected to a single microprocessor (FIG. 3, 16) and animated independently, in synch to each other and to a sound file.

A detailed description of this embodiment now follows.

The outer structure of the Flat Fiber Optic Display is shown in FIG. 1, 1—the translucent shell. This shell is cone-shaped to mimic a plume of jet exhaust and is made of lightly frosted plastic.

Figure 3:
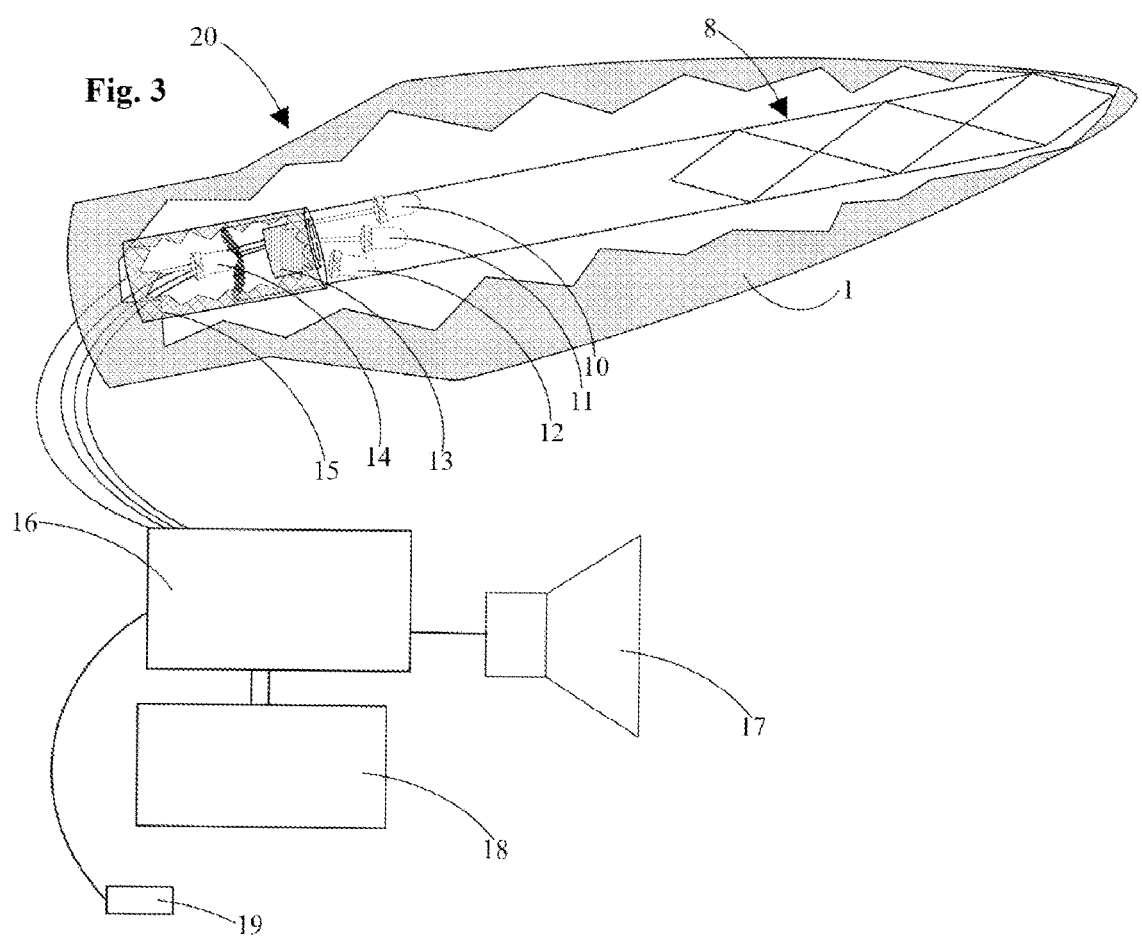

The LEDs used in the background glow display are yellow (FIGS. 3, 10 and 12) and red (FIG. 3, 11) and an LED holder shown at FIG. 3, 13, holds them in position. LEDs 10, 11 and 12 are strategically placed behind or within the constructed flat fiber optic material at FIG. 3, 8, (exact placement depends on whether one or two constructs of flat fiber optic material are used): first, they are separated lengthwise, allowing the animated program to illuminate them with a generally believable ignition/burn effect and second, they are placed well behind or within the flat fiber optic material to take advantage of the excellent diffusion properties of that material which create a uniform glow throughout the shell.

The construct of flat fiber optic material is the part of the Flat Fiber Optic Display that shows diamond shapes within the background glow. To achieve the effect of illuminated diamonds within a background glow, strips of flat fiber optic material are first cut to size for the desired diamond shape. In order to get 3 diamond shapes to appear within the shell, 3 sets of mated flat fiber optic material strips are assembled. Each set of strips has two different top edge cuts: a.—a point facing up as shown in FIGS. 2, 2, 4 and 6, and b.—a point facing down as shown in FIGS. 2, 3, 5 and 7.

A strip set is made by adhering an a. strip to a b. strip: 2 mated to 3, 4 mated to 5, and 6 mated to 7, with the longer a. strips in each set (2, 4 and 6) on the bottom of its set. Then the three resulting sets are permanently affixed one on top of the other, with the longest set of strips (set 2+3) at the bottom, the median sized set of strips (set 4+4) on top of that, and the shortest set of strips (set 6+7) at the top, as shown in FIG. 2, 8. Best practice to assemble the flat fiber strips is to position and glue them over a curved surface, so when the all the strips are permanently affixed together the resultant structure (FIG. 2, 8) has a 180° curvature.

The diameter of the fiber optic cables used in the flat fiber optic material determines how many LEDs are needed to illuminate the diamonds in the Flat Fiber Optic Display. In most instances, the diameter of fiber optic cables used in the flat fiber optic material will be small, and because the base edges of all six strips of FIG. 3, 8, are fastened together, a single blue LED (FIG. 3, 14) disposed in optical connection to those fastened edges will produce light that travels up the flat fiber optic material in all six strips to emit from the cut top edge of all six strips, producing an illumination in the shape of three blue diamonds. If different colored diamonds are desired or if different programming on the light of each diamond is desired, then the base edges of the fiber strips can be separated by set, and each set can be disposed in optical communication to a different or different colored LED, replacing the blue LED used here at FIG. 3, 14. A second LED holder (FIG. 3, 15) contains the blue LED (FIG. 3, 14) that illuminates the flat fiber optic material and also contains the LED holder for all LEDs in the background glow display (FIG. 3, 13).

These three strips showing 3 diamonds will appear on one side only of the translucent shell, offering an 180° view of the feature in the shell. To make the diamonds in a Flat Fiber Optic Display visible all around the shell in a 360° view, a duplicate of the final strip structure (FIG. 2A, 8-reverse) is placed back-to-back with the first strip structure (FIG. 2A, 8), creating a hollow column of flat fiber optic material. Taking care to match the side-ending points (marked as FIG. 2A, 9) of the first set to the side-ending points of the reversed set assures that the diamond shapes retain integrity and are visible all around the translucent shell. Note that although the base edges of pieces 2A, 8 and 2A, 8-reverse can touch, it is most likely necessary to add at least one other blue LED at the base edge of piece 2A, 8-reverse to illuminate the blue diamonds in that piece.

Programming drives the red and two yellow LEDs of the background glow display into the general look of an initial jet-fire explosion then follows with a general "burn" animation. The at least one blue LED lighting the diamonds produced by the final strip structure(s) of flat fiber optic material can be programmed with a simple on and off, or can have an animated program that is distinct from the program used for the background glow. Because the diamonds in piece 8 and piece 8-reverse are meant to represent two sides of a whole, the animation for the LEDs illuminating both strips must be in synch.

Since Mach diamonds only appear at supersonic speed, in simulation they should be invisible until that speed is reached. Therefore, there is a lapse in time between starting the ignition/burn glow and starting the illumination of blue diamonds to mimic the way a jet starts flying (showing ignition/burn) and then reaches supersonic speed (showing blue diamonds), and this mimicry adds an element of realism to the Flat Fiber Optic Display.

Various animating techniques for the LEDs can be used to create looks that synch to the sound of an engine roar, heard through the speaker at FIG. 3, 17. And, as previously mentioned, the LEDs are programmed to be off when not in use because this quiescence allows for a considerable power reserve that prolongs the life of the batteries shown at FIG. 3, 18. Activation of the Flat Fiber Optic Display is possible with a variety of switches or sensors placed in the Display circuit at FIG. 3, 19.

Of course, the lighted Flat Fiber Optic Display device at FIG. 3, 20 can take numerous different forms and represent numerous different themes or phenomena. It should be noted that creating illuminated outlines of stars, flowers, circles or other shapes can follow the same construction described above for diamonds construction, or can be achieved with optical fibers or reflective hollow plastic shapes placed in or around flat fiber optic material within the translucent shell as previously described.

With certain details of the present invention for a lighted display device 20 disclosed, it will be appreciated by one skilled in the art that changes and additions could be made thereto without deviating from the spirit or scope of the invention. This is particularly true when one bears in mind that the presently preferred embodiment merely exemplifies the broader invention revealed herein. Accordingly, it will be clear that those with certain major features of the invention in mind could craft embodiments that incorporate those major features while not incorporating all of the features included in the preferred embodiment.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. These claims shall be construed to cover not only the corresponding structure and material expressly described in this specification but also all equivalents thereof that might be now known or hereafter discovered.

I claim:
1. An illuminated display device comprising:
a translucent container that has an illumination volume;
one piece of flat fiber optic material that is cut to desired design at a top thereof;
at least one illumination device disposed in optical communication with a base edge of the flat fiber optic material to provide illumination that travels to a top edge of the material to emit light and thereby provide an illuminated display;

means for illuminating the at least one illumination device disposed in optical communication with the base edge of the flat fiber optic material;

means for causing the at least one illumination device to illuminate in a pattern.

2. The illuminated display device of claim 1 further comprising multiple pieces of flat fiber optic material wherein the multiple pieces of flat fiber optic material:

are cut into a coordinated design at the top;

have their base edges mated together in one or more bundles;

have the bundled members of the base edges disposed in optical communication with at least one illumination device per bundle to provide illumination that travels to the top edge of the material to emit light and thereby provides an illuminated display.

3. The illuminated display device of claim 1 further comprising one or more additional illuminated displays having their illumination device(s) placed behind the flat fiber optic material or within a flat fiber optic material construct and independently illuminated to emit light seen around and through the flat fiber optic material and within the illumination volume of the translucent container.

4. The illuminated display device of claim 3 wherein the illumination device(s) comprise light emitting diodes (LEDs).

\* \* \* \* \*